Dec. 28, 1943.    M. SHUMAN    2,337,942
ASSORTING MACHINE
Filed Jan. 18, 1943    2 Sheets-Sheet 1
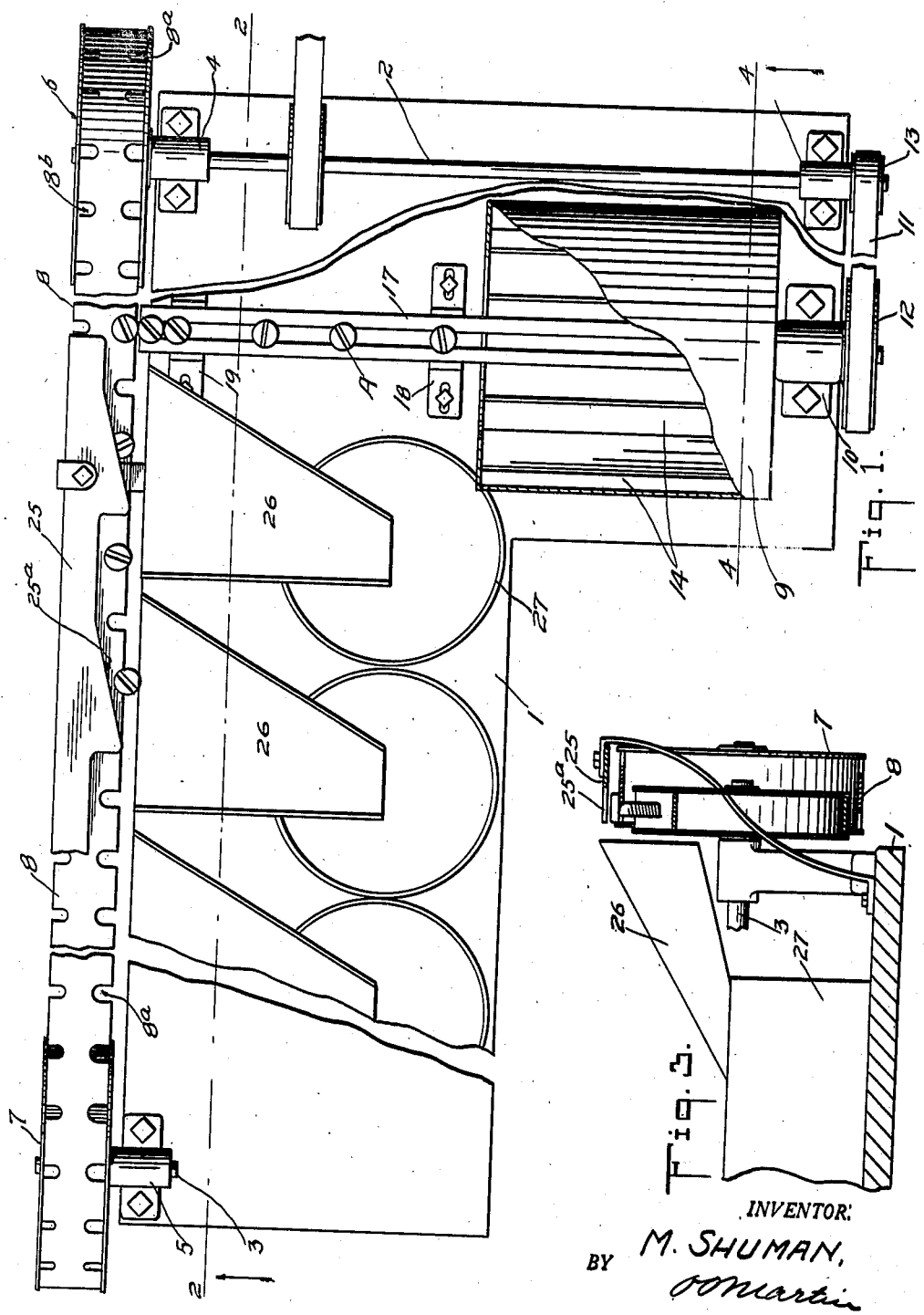
INVENTOR:
M. SHUMAN,
BY
ATTORNEY.

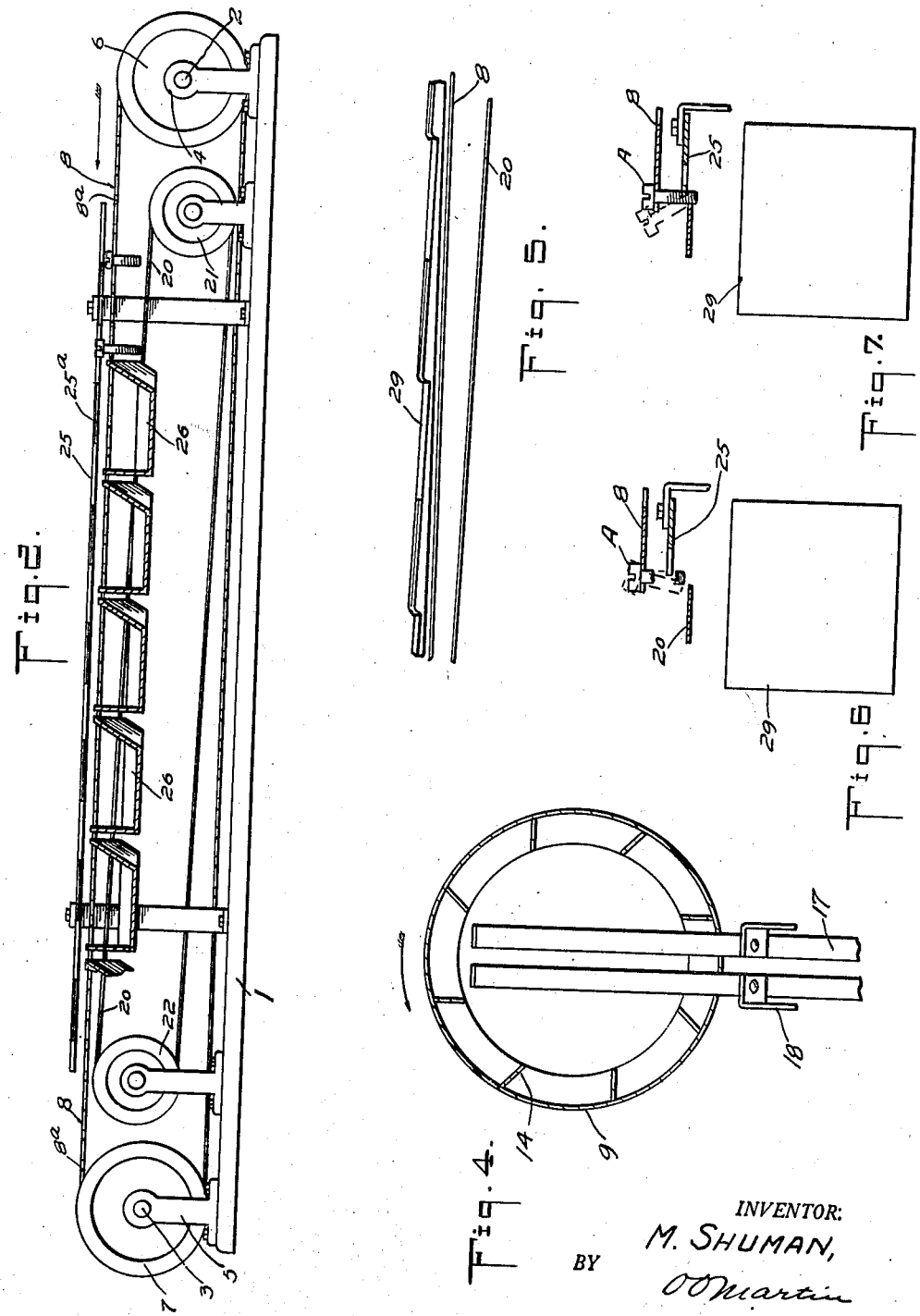

Patented Dec. 28, 1943

2,337,942

UNITED STATES PATENT OFFICE 2,337,942

ASSORTING MACHINE

Moses Shuman, Los Angeles, Calif.

Application January 18, 1943, Serial No. 472,706

8 Claims. (Cl. 209—90)

This invention relates to a device for assorting articles such as screws and rivets, and has particular reference to means for assorting articles of uniform diameter but varying in length.

It is the general object of my invention to provide a simple, inexpensive and highly efficient device for correctly assorting articles of many different lengths and where length variations are slight. With this object in view, the invention resides in the combinations hereinafter fully described, and drawings are hereto appended in which preferred forms of the invention are illustrated.

In the drawings:

Fig. 1 is a plan view of a device embodying the invention;

Fig. 2 is a front elevational view of the device of my invention, in which the upper front portion has been broken away substantially on line 2—2 of Fig. 1;

Fig. 3 is a sectional end view of the device of Fig. 1, taken substantially through the center thereof;

Fig. 4 is a fragmentary sectional view of parts of Fig. 1 taken substantially on line 4—4 thereof;

Fig. 5 is a fragmentary view illustrating a slight modification of a part of Fig. 1; and Figs. 6 and 7 are fragmentary cross-sectional views showing a re-arrangement of parts of Fig. 1.

The device of my invention comprises a base 1, on which are mounted shafts 2, 3, seated to rotate in suitable bearings 4, 5. Pulleys 6, 7 are secured to these shafts and they are shaped to support therebetween tightly stretched, continuously driven belt 8. A hopper, in the form of a drum 9, is held rotatable in a bearing 10, and it is shown connected for rotation by a belt 11, hung on pulleys 12, 13 of the drum shaft and the shaft 2, respectively.

A chute 17 is supported on brackets 18, 19, and it extends from the interior of the drum to the edge of the upper reach of the belt 8. This chute consists of parallel bars, which are sufficiently spaced apart to admit the shank of the articles to be assorted. For the sake of simplicity, these articles are hereinafter mostly referred to as screws. The bars of the chute are downwardly directed toward the belt in order that the screws, held suspended by their heads therebetween, will by gravity move toward the belt and enter notches 8a thereof, as the belt moves past the chute.

Within this belt, which conveniently may be termed the conveyor belt, is mounted a second belt 20, hung between pulleys 21, 22, which are suitably connected continuously to drive this belt in the direction of the conveyor belt and at the same speed. It is noticed that the upper reach of this belt gradually rises as it advances, thereby to push the screws A upward as they are carried along the conveyor belt. Above the latter is mounted a stationary plate 25, and this plate is made along its front edge with cam shaped notches 25a, positioned directly above the path of travel of the screws on the conveyor belt.

It is readily seen that each screw advances with the conveyor belt until its lower end comes in contact with the belt 20, hereinafter for convenience referred to as the elevator belt, and gradually is pushed upward into the deepest portion of one of the cam plate notches to bring the head of the screw in line with the edge of the cam on the plate. As the screw continues to advance, it is seen that it gradually is pushed sidewise over the edge of the conveyor belt to drop into an inclined chute 26, finally by gravity to be deposited in a suitable receptacle 27.

It is to be understood that the two belts 8 and 20 can be made of any suitable length, so as to be capable of handling many such articles of different lengths. Also that the angle of inclination of the elevator belt has a fixed relation to the length of the cam notches of the plate 25, in order that each screw head may have time to rise into alinement with the edge of the cam portion thereof. The cam plate must, of course, be so positioned lengthwise of the belt that the screw heads will rise into alinement vertically with the edge of the cam portion thereof before reaching this portion of the plate. If found advisable, where the length variations of the screws is fine, it is possible to shape the cam plate as indicated in Fig. 5, where the notched portions of the plate 29 rise on an angle equal to that of the upper reach of the elevator belt.

The hopper drum is shown fitted with blades 14, and these blades are inclined in the direction of rotation of the drum. The screws to be assorted are thrown into this hopper, which is caused to rotate slowly to permit the blades to pick up some screws from the bottom thereof and to carry them upward until the gradually changing inclination assumed by the blades reaches an angle of sufficient slope to cause the screws carried thereby by gravity to drop on to the chute 17. As they slide down the chute, they will gradually swing into upright position, held therein by their heads, so as to be in a position to enter the notches 8a of the conveyor belt.

The notches 8a of the conveyor belt should be deep enough to support the screw head and should fit the shanks of the screw fairly closely in order to maintain the screws in position on the belt. As a consequence, it is found that a slight rearward tilt of the screw will cause the screw to bind in the notch and make it difficult to expel therefrom, and this is a reason for moving the belt 20 forward at the same speed. Where on the other hand the screw head is relatively large, the notches 8a may be wider, and the belt 20 may then remain stationary or be replaced by a stationary bar. But it is preferred to maintain the combination of the two belts moving in the same direction at the same speed and approaching each other vertically, together with stationary cam plate.

The device of my invention is designed to assort screws of various diameters, and the spacing of the bars of the chute 17 may be varied accordingly. Notches 8$^b$, for a different diameter screw are shown made in the opposite edge of the belt 8, which of course may be reversed to bring these notches into service; and other belts must be provided for additional sizes of screws.

It is possible, however, to re-arrange these control members to eject the screws from the notches in a somewhat different manner, and such re-arrangement is indicated in Figs. 6 and 7. The belt 8 remains entirely unchanged to receive screws from the chute as shown in Fig. 1. The belt 20 may also remain exactly as indicated in Fig. 2, but instead of taking the position below the upper reach of the belt 8 shown in Fig. 1, it is moved forward horizontally to bring its rear edge substantially in vertical alignment with the forward edge of the belt 8 as indicated in Figs. 6 and 7. The cam plate 25 is moved vertically from above the belt 8 to a position a shorter distance below the upper reach of this belt.

As a result of this re-arrangement of the three parts it is seen that each screw travels forward until the rear edge of the rising belt 20 reaches and rises above the lower end of the screw, whereupon the intermediate portion of the screw rides along the cam surface of the bar 20 until the screw becomes expelled from the notch of the conveyor belt. It is true that before the edge of the belt 20 rises in front of the end of the screw a sidewise rocking movement is imparted to the latter as it moves past the cams on the plate 25, but the rise of the cams on the plate can be materially reduced because in the arrangement of Figs. 6 and 7 a relative short tilt movement of the screw on the cam imparts sufficient lateral movement to the screw head to dislodge the screw and cause it to drop in a suitable receptacle 29. This rocking movement is for this reason and on account of the relatively slow movement of the belt not sufficient to dislodge the screw.

In view of this it is seen that the essential combination of two belts moving in the same direction at the same speed, and with upper reaches gradually approaching each other, together with a stationary cam plate, all remain the same in each case, and that merely the relative location of the parts is modified. I do not, however, wish to be confined to the particular arrangement shown, but reserve the right to embody modifications within the scope of the claims hereto appended.

I claim:

1. A device for assorting screws as to length comprising a continuously moving notched belt, means for feeding screws to the notches of the belts to hold the screws suspended therein by their heads, an upwardly inclined belt moving with said notched belt gradually to reach the end of each screw, and a stationary cam plate parallel with said notched belt for laterally ejecting the screws from the notches as the second belt contacts the screw ends.

2. A device for assorting screws as to length comprising a continuously moving belt shaped to hold screws suspended by their heads, a second belt movable with said first belt and gradually rising to contact the ends of the suspended screws, and cam means parallel with said first named belt for laterally ejecting the screws from said first named belt as the ends of the screws are contacted by said second belt.

3. A device for assorting screws as to length comprising a continuously moving notched belt, means for feeding screws to the notches of the upper reach of the belt to hold the screws suspended therein, a second belt having its upper reach below the upper reach of said notched belt, moving therewith and gradually approaching the latter, thereby to rise into contact with the ends of the screws and to elevate the latter, and cam means above said notched belt in the path of travel of the elevated screws to eject the screws from the said notches.

4. A device for assorting screws as to length comprising a continuously moving notched belt, a hopper, a chute extending from said hopper for feeding screws to the notches of the belts to hold the screws suspended therein by their heads, an upwardly inclined belt moving with said notched belt gradually to reach the end of each screw, and a stationary cam plate parallel with said notched belt for laterally ejecting the screws from the notches as the second belt contacts the screw ends.

5. A device for assorting screws as to length comprising a continuously moving reversible belt having notches in its edges of different sizes, means for feeding screws of corresponding sizes to the notches of the belts to hold the screws suspended therein by their heads, an upwardly inclined belt moving with said notched belt gradually to reach the end of each screw, and a stationary cam plate parallel with said notched belt for laterally ejecting the screws from the notches as the second belt contacts the screw ends.

6. A device for assorting screws as to length comprising a continuously moving notched belt, means for feeding screws to the notches of the belts to hold the screws suspended therein by their heads, an upwardly inclined belt moving with said notched belt gradually to reach the end of each screw and to cause the rear edge of this belt to rise in front of the screw end, and cam means between said belts for engaging the side of the screw to cause it to tip on said inclined belt edge and to become expelled from the belt notch.

7. A device for assorting screws as to length comprising a continuously moving belt having one size notches along one edge and a different size notches along the other edge, means adjustable to the size of notches employed for feeding screws of corresponding diameter thereunto to be held suspended therein by their heads, a second belt movable with said notched belt and gradually rising to contact the screw ends, and cam means parallel with said notched belt for laterally expelling the screws from the notches when contacted by said cam means.

8. A device for assorting screws as to length comprising, a continuously moving belt shaped to hold screws suspended by their heads, an inclined belt movable with said first named belt and gradually rising to contact and to elevate the suspended screws, and means above said belts having inclined cam surfaces substantially parallel with said inclined belt and positioned in the path of travel of the elevated screws for laterally ejecting said screws from said first named belt.

MOSES SHUMAN.